Nov. 2, 1965　　　W. B. McCARDELL　　　3,214,951
APPARATUS FOR ROLLING TEETH ON TUBULAR ELEMENTS
Filed March 11, 1963　　　　　　　　　　　　3 Sheets-Sheet 1
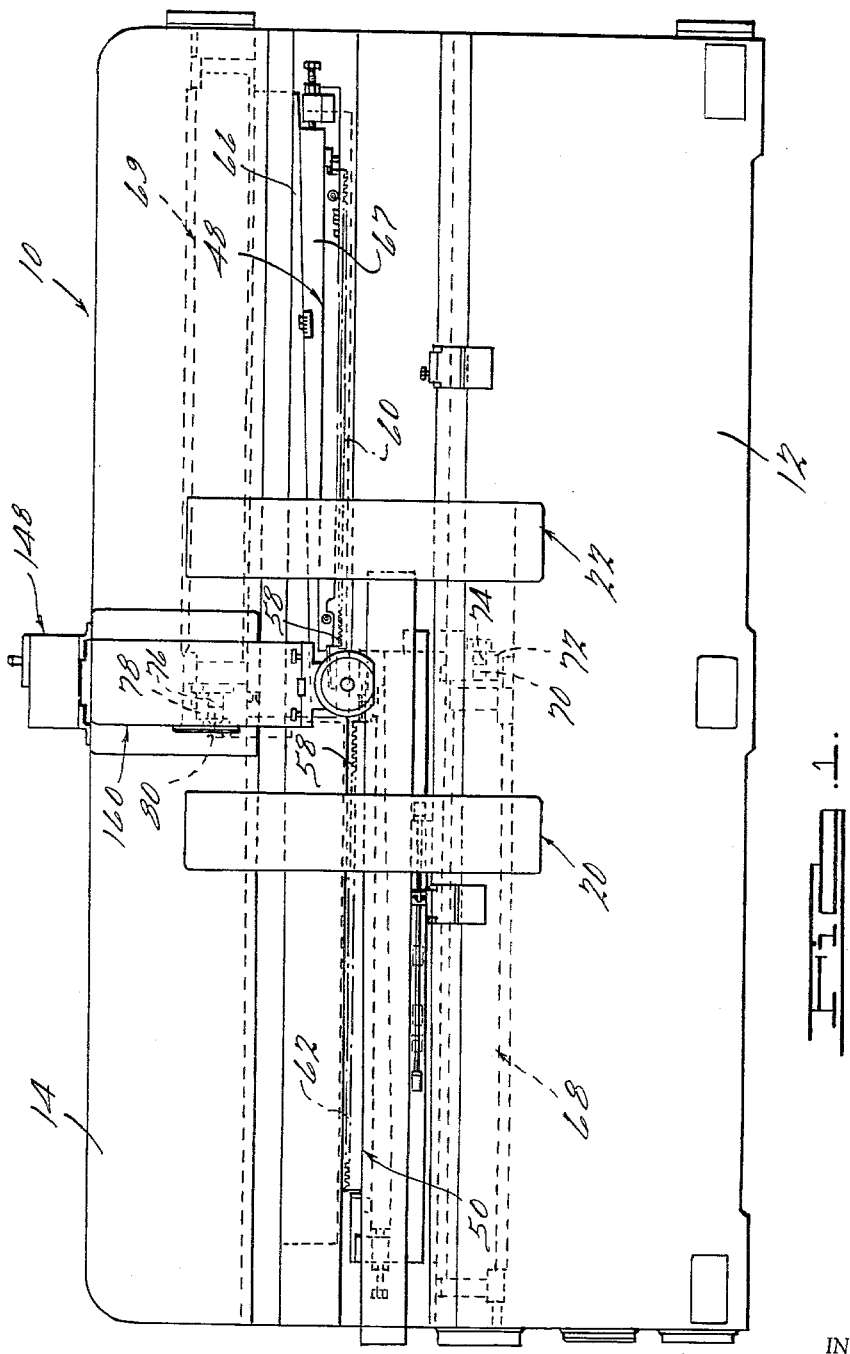
INVENTOR.
Willard B. McCardell
BY
Harness, Dickey & Pierce
ATTORNEYS.

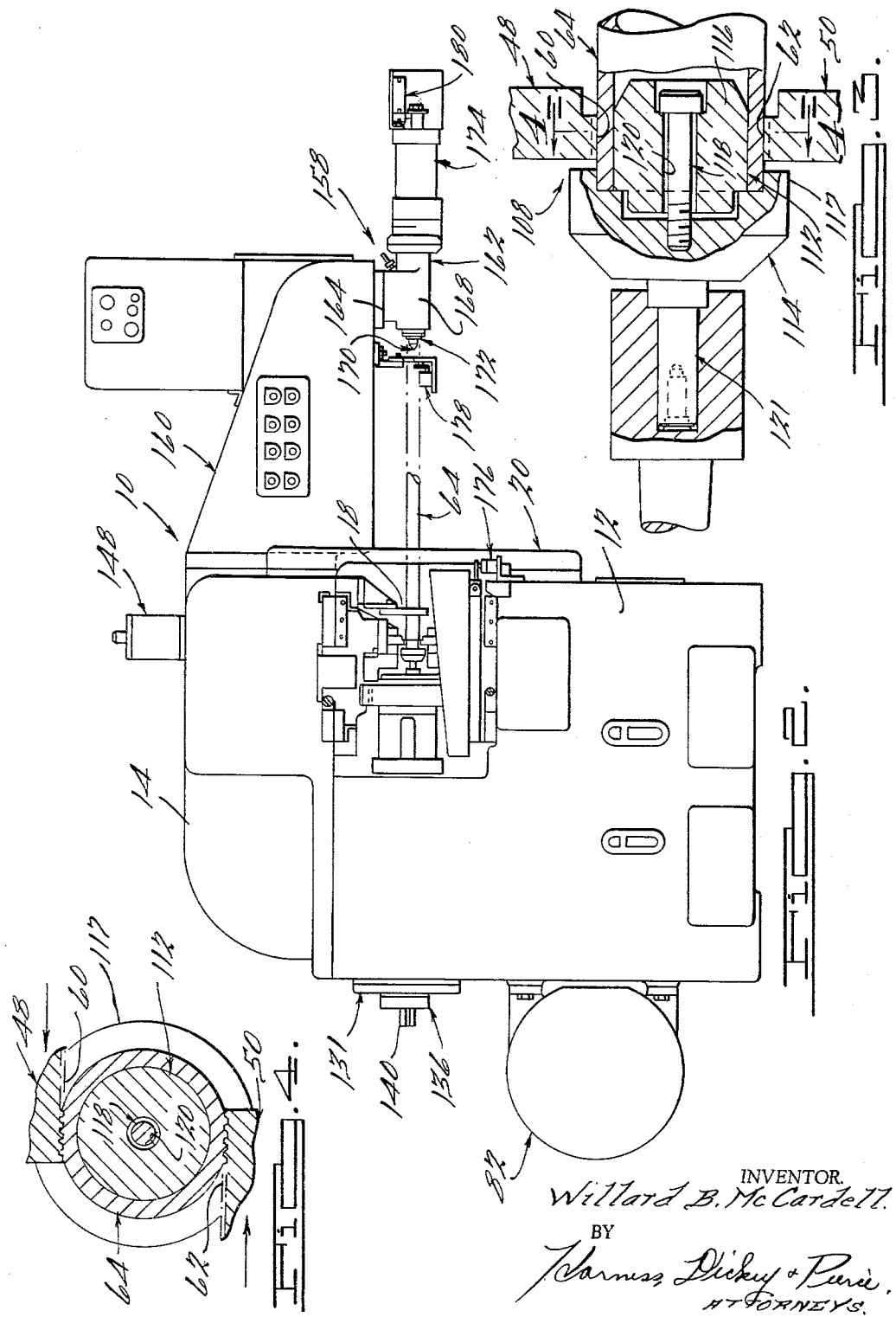

Nov. 2, 1965 W. B. McCARDELL 3,214,951
APPARATUS FOR ROLLING TEETH ON TUBULAR ELEMENTS
Filed March 11, 1963 3 Sheets-Sheet 3

INVENTOR.
Willard B. McCardell
BY
Harness, Dickey & Pierce.
ATTORNEYS.

United States Patent Office 3,214,951
Patented Nov. 2, 1965

3,214,951
APPARATUS FOR ROLLING TEETH ON
TUBULAR ELEMENTS
Willard B. McCardell, Royal Oak, Mich., assignor to
Michigan Tool Company, Detroit, Mich., a corporation
of Delaware
Filed Mar. 11, 1963, Ser. No. 264,085
3 Claims. (Cl. 72—88)

This invention relates generally to the forming of annular surfaces, and more particularly to a method and apparatus for forming teeth, such as splined teeth, gear teeth and the like, on tubular members.

An object of the present invention is to provide an improved method and apparatus of rapidly and accurately forming external teeth on thin-walled tubular members without deforming or otherwise damaging the tubular member.

Another object of the present invention is to provide an improved method and apparatus of pressure-forming teeth on tubular members which facilitates the formation of the teeth with a minimum of time, labor and expense.

Still another object of the present invention is to provide an improved method and apparatus of forming teeth on tubular members not requiring the cutting or removing of any material from the tubular members.

Still another object of the present invention is to provide an improved method and apparatus for supporting the tubular members during the formation of external teeth thereon.

Other objects and advantages of the present invention will become apparent from the following description, the appended claims and the accompanying drawings, wherein:

FIGURE 1 is a front elevational view of a tooth-forming machine embodying the present invention and showing the starting positions of the teeth-forming racks incorporated therein;

FIGURE 2 is an end elevational view of the forming machine illustrated in FIGURE 1 illustrating the location of a typical tubular workpiece when positioned within the machine;

FIGURE 3 is a fragmentary cross-sectional view of a tubular workpiece support spindle embodying the present invention;

FIGURE 4 is a fragmentary cross-sectional view taken substantially along the line 4—4 of FIGURE 3 and illustrating the relative directions of movement of the tooth-forming tools during the forming operation.

Figure 5:
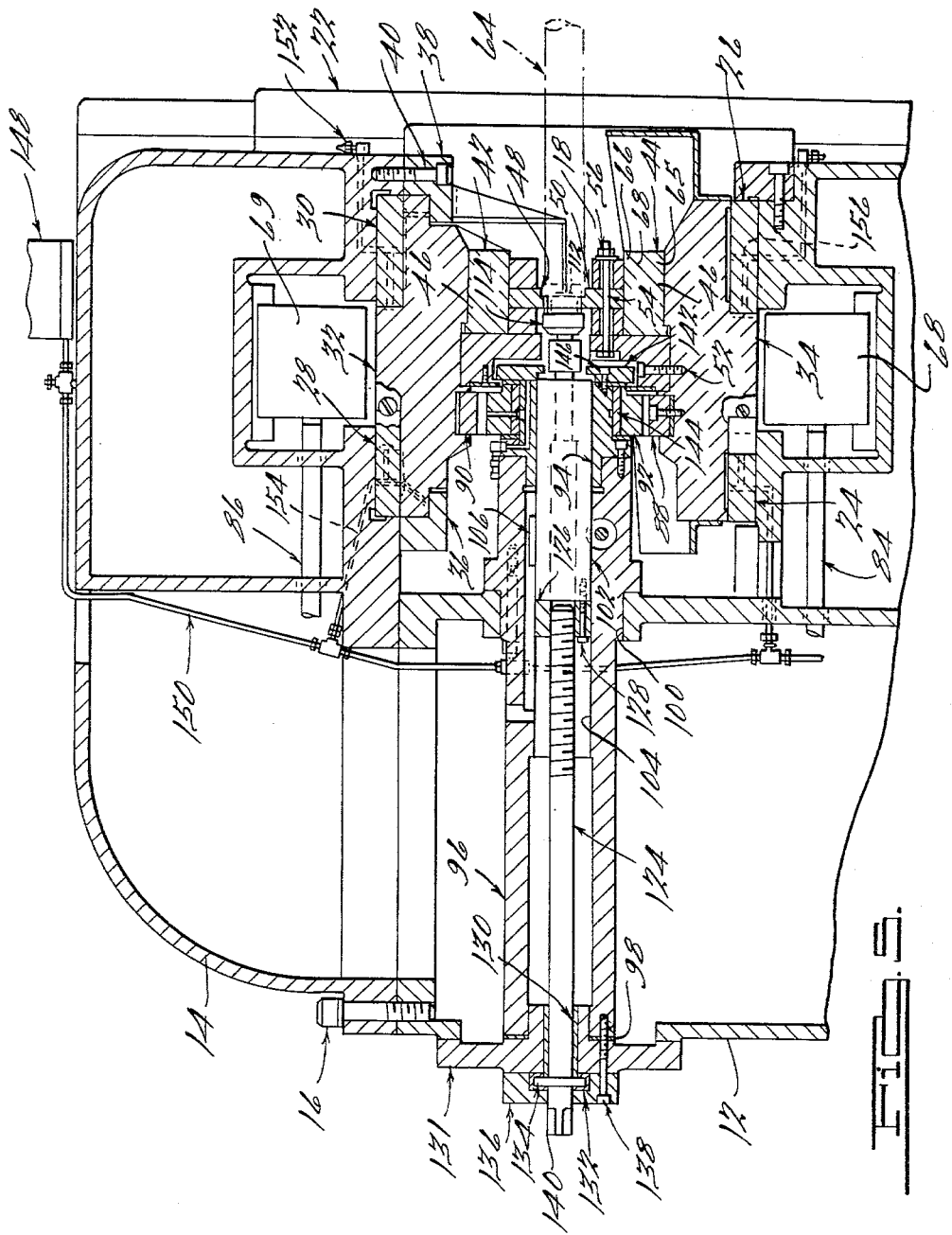
FIGURE 5 is a transverse sectional view of a portion of the forming machine shown in FIGURE 1.

In general, the invention comprises a method and apparatus for generating external teeth on tubular workpieces without necessitating the cutting or removal of material from the workpieces and without requiring any prior tooth-forming operations. The forming machine embodying the present invention is adapted to subject a tubular workpiece to the action of a pair of rack type tools which move simultaneously in opposite directions. The tools have disposed thereon a plurality of teeth of a conjugate shape with respect to the teeth to be formed on the tubular workpiece and, by utilizing fluid pressure as applied from the forming machine, the tools form the teeth on the periphery of the workpiece by displacing the metal therein.

During the tooth-forming operation, the tubular workpiece is rotatably supported between axially aligned support members disposed in the throat and tailstock assembly of the forming machine. The end portion of the tubular workpiece on which the teeth are to be impressed is supported interjacent the tooth-forming tools by a generally circular support spindle which has a cylindrical support mandrel and an axially extending confining flange adapted to accept and confine that end portion to prevent any undesirable deformation thereof during the tooth-forming operation. It should be noted that the generation of teeth on the workpiece may be accomplished when the workpiece is at an ambient temperature thereby further facilitating the rapid formation of teeth thereon by obviating the necessity for prior heat applying operations.

Referring now to the drawings, a tooth-forming machine 10 embodying the present invention is illustrated comprising a lower base 12 and an upper base 14 fixedly interconnected as by bolts 16. The lower base 12 and the upper base 14 are preferably of a heavy and rigid construction and define an elongate throat 18 having a generally C-shaped transverse cross section. In order to increase the rigidity of the machine 10, a pair of tie bars 20 and 22 are provided, the upper and lower end portions thereof being secured to the upper base 14 and the lower base 12, respectively.

A pair of spaced, parallel lower slideways 24 and 26 are mounted within the lower base 12, and an identical pair of parallel slideways 28 and 30 are mounted above the slideways 24 and 26 in a vertically spaced confronting relationship such that the bearing surfaces of the slideways 24 and 26 and slideways 28 and 30 are disposed in vertically spaced parallel planes. Upper and lower slide members 32 and 34, respectively, are slidably mounted on the upper and lower slideways 28, 30 and 24, 26, respectively, the upper slide member 32 being retained within the upper base portion 14 by a pair of retaining members 36 and 38 and by bolts 40.

A pair of tool holders 42 and 44 having a body portion 46 are provided to retain a pair of substantially identical rack type tooth-forming tools 48 and 50, respectively. The tool holders 42 and 44 are fixedly secured to the upper and lower slide members 32 and 34, respectively, as by bolts 52, and retain the tooth-forming tools 48 and 50 as by bolts 54, which pass through the tools and the body portion 46 of the tool holders 42 and 44 and are retained therein as by nuts 56.

The tools 48 and 50 may be of the type disclosed in United States Letters Patent No. 3,015,243, issued January 2, 1962, and assigned to the assignee of the present invention. For the purposes of the present invention, it is sufficient to state that the tooth-forming tools 48 and 50 are provided with teeth 58 on the working surfaces 60 and 62, respectively, thereof. The spacing between the working faces 60 and 62 of the tools 48 and 50 is less than the outside diameter of a typical tubular workpiece 64, or the diameter of that portion of the workpiece upon which the teeth are to be formed. The shape or configuration of the working faces 60 and 62 is impressed upon the periphery of the workpiece 64 upon a simultaneously tangential movement of the tools 48, 50 relative to the workpiece 64. The spacing between the working faces 60 and 62 of the tools 48 and 50 is regulated so that the depth of the impression made on the workpiece gradually increases as the surfaces of the tools traverse across the workpiece. This gradual increase in the depth of the impression formed by the tools may be attained by either inclining the pitch line of the tool teeth or, by gradually increasing the height of the tool teeth while holding the pitch line level, or by a suitable combination of these two methods.

In order to facilitate adjusting the distance between the working faces 60, 62 of the tools, each of the tool holders 42 and 44 is provided with an adjustable gib portion 65 which is interposed between the tool and its associated slide member. As shown in FIGURE 1, the gib portion 65 of each of the tool holders includes mating sections 66 and 67 having mating tapering surfaces therebetween. With such a construction, longitudinal movement of one section of the gib portion of each tool holder relative to the other section thereof effects vertical movement of the associated tool 48 or 50.

In order to simultaneously drive the slide members 32, 34 and their respective tools 48, 50 in opposite directions, a pair of hydraulic piston and cylinder assemblies 68 and 69 are provided which are fixedly mounted to the lower and upper bases 12 and 14, respectively. The hydraulic piston and cylinder assembly 68 includes a piston rod 70 that is secured to a general outwardly projecting portion 72 of the lower slide member 32, as at 74, while the piston and cylinder assembly 69 includes a piston rod 76 and is secured to a general outwardly projecting portion 78 of the upper slide member 34, as at 80. The piston and cylinder assemblies 68, 69 are substantially identical in size and are interconnected to a common source of fluid pressure such as a suitable hydraulic pump unit 82, by inlet and outlet conduits 84 and 86. A control valve (not shown) is interposed between the piston and cylinder assemblies 68, 69 and the common source of fluid pressure 82 to simultaneously control both piston and cylinder assemblies 68 and 69. It should be noted that since the piston and cylinder assemblies 68, 69 are connected to a common source of fluid pressure, the slide members 32 and 34 are concurrently biased at the same velocity in opposite directions due to the interlocking effect of the hydraulic pressure on the piston and cylinder assemblies 68, 69.

In order to insure the synchronization of the slide members 32 and 34, a pair of synchronizing rack members 88 and 90 are provided which are fixed to the slide members 32 and 34, respectively, and extend in a relatively spaced parallel relationship with respect to the tooth-forming tools 48 and 50. The synchronizing rack members 88, 90 simultaneously mesh with a complementary idler gear 92 rotatably mounted on a suitable bracket 94. The bracket 94 is mountedly secured to a spindle support member 96 which is in turn mounted to the lower base 12 as at 98 and 100. A cylindrical spindle sleeve 102 extends longitudinally within a bore portion 104 of the spindle support member 96 and is keyed thereto to preclude any relative movement therebetween as by a key 106.

The tubular workpiece 64 is supported within the elongate throat 18 of the forming machine 10 by a generally cylindrical support spindle 108 which projects into the elongate throat 18 and terminates at a position interjacent the tools 48 and 50. The support spindle 108 comprises an axially extending cylindrical support mandrel 112 and an axially extending confining member 114 which is circular in cross-section, and the support spindle 108 is adapted to support and confine, both internally and externally, that end portion of the tubular workpiece on which the teeth are to be formed.

As best seen in FIGURES 3 and 4, the support mandrel 112 is disposed substantially interjacent the working faces 60 and 62 of the tools 48 and 50, respectively, and is adapted to removably receive the end portion of the tubular workpiece 64 thereon for the internal support thereof during the tooth-forming operation. The support mandrel 112 has a generally tapered outer end portion 116 which facilitates the insertion thereof within the bore of the tubular workpiece 64 during the aforesaid forming operation.

The confining member 114 has a general axially extending flange portion 117 spaced radially outward from the support mandrel 112 for confining the periphery of the end portion of the tubular workpiece 64 during the tooth-forming operation to further prevent any deformation thereof. The support mandrel 112 is affixed to the confining member 114 as by a bolt 118 extending within a bore 120 disposed in the support mandrel 112. The bore 120 is slightly larger than the bolt 118 permitting limited movement of the support mandrel 112 with respect to the confining member 114 to facilitate rapid positioning and removal of the tubular workpiece 64 therebetween. The support spindle 108 is rotatably mounted within the spindle sleeve 102 as by a support arbor 121 and allows rotation of the tubular workpiece 64 and support spindle 108 while the tooth-forming tools are biased in opposite directions tangentially thereto.

In order to facilitate axial adjustment of the support spindle 108, an elongate screw 124 is provided, one end portion of which threadably engages a nut 126 secured to the spindle sleeve 102, as by bolts 128. The opposite end portion of the screw 124 extends axially through a suitable sleeve bearing 130 mounted in an end cap 131. A thrust bearing 132 is provided which engages an annular shoulder 134 provided on the screw 124, the assembly being retained by a clamping ring 136 which is secured to the spindle support member 96, as by bolts 138. An end portion 140 of the screw 124 projects through the clamping ring 136 and preferably formed thereon is a noncircular wrench engaging surface which facilitates turning the screw 124 as with a wrench. With such a construction, rotation of the screw 124 in one direction advances the spindle sleeve 102 and the support spindle 108 towards the tools 48 and 50 while rotation of the screw 124 in the opposite direction retracts the spindle sleeve 102 and support spindle 108 from the tools 48 and 50.

At a position adjacent the support spindle 108, an end cap 142 is provided which serves to retain the driving gear 92 and a bearing 144 interposed between the driving gear and the bracket 94, the end cap 142 being secured to the bracket 94 by bolts 146.

As best seen in FIGURE 1 of the drawings, a lubricant reservoir 148 is mounted on top of the upper base 14. The lubricant flows from the reservoir 148 through suitable conduits such as 150 and 152, through ducts, such as 154 and 156, to the bearing surfaces of the upper and lower slide members 32 and 34, as well as to the teeth of the driving gear 92 and to other bearing surfaces of the machine 10.

A tailstock assembly, generally designated 158, is provided which is mounted on a support arm 160, cantilevered outwardly from the upper base 14. The tailstock assembly 158 also includes a tailstock 162 having an upwardly projecting flange portion 164 mounted for sliding movement on suitable slideways disposed within the support arm 160. The tailstock 162 comprises a body portion 168 and a tailstock center 170, the latter being mounted on a suitable spindle 172 extending longitudinally through the body portion 168 of the tailstock 162. The tailstock assembly 158 is provided with a suitable piston and cylinder assembly 174 operable to effect longitudinal movement of the tailstock center 170 with respect to the workpiece 64.

The hydraulic piston and cylinder assemblies 68, 69 and the piston and cylinder assembly 174 are controlled by a system of limit switches such as 176, 178 and 180, which are operable to control suitable electric circuits which serve to actuate solenoid valves interposed between the piston and cylinder assemblies and the source of fluid pressure, thereby actuating the piston and cylinder assemblies 68, 69 and 174 as dictated by movement of the slide members 32 and 34 and the tailstock center 170, respectively.

In the operation of the forming machine 10, the workpiece 64 is inserted in the throat 18 such that the longitudinal axis of the workpiece 64 is axially aligned with both the support spindle 108 and the tailstock center 170. The piston and cylinder assembly 174 is then actuated to advance the tailstock center 170 towards the throat 18, thus biasing the workpiece 64 into engagement with the support spindle 108 so that the workpiece 64 is rotatably supported between the support spindle 108 and the tailstock center 17. The hydraulic piston and cylinder assemblies 64 and 69 are then actuated so as to simultaneously drive the forming tools 48 and 50 at the same speed in opposite directions. Since the spacing between the working faces 60 and 62 of the tools 48 and 50, respectively, is less than the outer diameter of the tubular workpiece 64, the shape of the faces 60 and 62 of the tools is impressed or conjugated on the periphery of the workpiece. As previously discussed, the spacing between the working faces 60 and 62 of the tools 48 and 50 is initially adjusted so that the depth of the impression made in the workpiece gradually increases as the tools move relative to the longitudinal axis of the workpiece, the faces 60 and 62 moving closer together in a horizontal plane through the axis of the workpiece as the length of stroke increases. After the trailing ends of the tools 48 and 50 pass over the workpiece 64, the piston and cylinder assembly 174 is actuated to retract the tailstock 162, enabling removal of the workpiece 64 from between the support spindle 108 and the tailstock center 170. The hydraulic piston and cylinder assemblies 68, 69 are actuated to return the tools to their initial starting position. A new workpiece may then be inserted between the support spindle 108 and the tailstock center 170 and the cycle repeated.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a machine for forming external teeth adjacent one end of a tubular cylindrical element, a plurality of tooth-forming tools having working surfaces mounted in spaced relationship on opposite sides of the tubular element adjacent said one end, means for moving said tools transversely to the element axis, and support means supporting said tubular element for rotation about its longitudinal axis, said support means including confining means surrounding the periphery of one end portion of the tubular element, said confining means comprising an axially extending flange having an internal cylindrical surface with substantially the same diameter as the external surface of said tubular element and in continuous engagement therewith around the entire periphery of said tubular element so as to confine said tubular element and prevent any deformation thereof while said teeth are being formed, and mandrel means internally supporting said one end portion adjacent said working surfaces of said tools.

2. The combination according to claim 1, said flange and mandrel means being connected for relative radial movement and extending in a direction parallel to the longitudinal axis of said tubular element.

3. A method of forming external projections adjacent one end of a tubular cylindrical workpiece which includes the steps of initially supporting the workpiece for rotation about its longitudinal axis while confining said one end portion thereof both internally and externally so as to prevent any radial inward or outward movement of the material of said end portion, and thereafter forcing a succession of tool teeth conjugate to the projections to be formed on the tubular workpiece into said workpiece adjacent said end portion while said workpiece rotates about its longitudinal axis.

References Cited by the Examiner

UNITED STATES PATENTS

| | | | |
|---|---|---|---|
| Re. 24,441 | 3/58 | Parker | 80—6 |
| 2,330,556 | 9/43 | Carlson | 80—6 |
| 2,358,307 | 9/44 | Dewey | 80—13 |
| 2,995,964 | 8/61 | Drader | 80—20 |

FOREIGN PATENTS 1,196,907   6/59   France.

CHARLES W. LANHAM, *Primary Examiner.*